United States Patent [19]

Spanke

[11] 4,135,611
[45] Jan. 23, 1979

[54] PRESS DRIVE CLUTCH WITH BRAKE

[75] Inventor: Edwin A. Spanke, Oak Forest, Ill.

[73] Assignee: Gulf & Western Manufacturing Company, Southfield, Mich.

[21] Appl. No.: 764,223

[22] Filed: Jan. 14, 1977

[51] Int. Cl.² ............................................. F16D 67/04
[52] U.S. Cl. ................................ 192/18 A; 192/110 B
[58] Field of Search .................. 192/18 A, 18 R, 18 B, 192/110 B

[56] References Cited

U.S. PATENT DOCUMENTS

| | | | |
|---|---|---|---|
| 2,441,543 | 5/1948 | Longfield | 192/18 A |
| 2,798,583 | 7/1957 | Jeszka et al. | 192/18 B X |
| 3,494,450 | 2/1970 | Mankowsky | 192/18 A |
| 3,713,517 | 1/1973 | Sommer | 192/18 A |

Primary Examiner—Benjamin W. Wyche
Attorney, Agent, or Firm—Meyer, Tilberry & Body

[57] ABSTRACT

A press drive mechanism is disclosed having relatively rotatable output shaft and flywheel components which are independently rotatably supported at their opposite ends by fixed support members. The flywheel is mounted on a sleeve which is concentric with the output shaft and located between the opposite ends of the shaft. Clutch discs are cooperatively supported by the sleeve and output shaft, and brake discs are cooperatively supported by the output shaft and one of the fixed support members. The brake and clutch are alternately engaged and disengaged by means of a pneumatic piston and cylinder assembly concentric with the output shaft inwardly adjacent the other of the fixed support members.

14 Claims, 4 Drawing Figures

PRESS DRIVE CLUTCH WITH BRAKE

This invention relates to the art of transmissions and, more particularly, to a brake-clutch-flywheel mechanism for use with heavy machinery such as metalworking presses.

Liquid cooled and lubricated brake-clutch-flywheel drive mechanisms have been provided heretofore for use with presses. Such mechanisms generally include an output shaft, a flywheel driven by a motor, a clutch assembly for selectively connecting and disconnecting the flywheel and output shaft, and a brake assembly for braking rotation of the output shaft when the clutch is actuated to disengage the flywheel and output shaft. A suitable liquid, such as oil, is circulated through the interior of the drive unit to lubricate and cool the operating parts thereof, including the brake and clutch disc components, during operation of the drive mechanism.

In conjunction with drive mechanisms of the foregoing character, it is desirable that they can be manufactured as a unit readily useable either with a new press or as a replacement for the drive unit of existing presses. In conjunction with both these potential uses it is desirable that the drive mechanism lend versatility with regard to mounting thereof, that the unit be as compact as possible both axially and radially with respect to the output shaft, and that the component parts be structurally interrelated to enhance the use of high-production techniques in manufacturing and, at the same time, to optimize operating characteristics in connection with a variety of press designs. Additionally, it is desirable that the component parts be structurally interrelated so as to minimize unbalanced loading and the imposition of undesirable load forces, and to avoid the potential danger of rotation of the output shaft through the flywheel when the clutch is disengaged.

Certain of the foregoing desirable features have been obtained with brake-clutch-flywheel mechanisms heretofore provided. However, in connection with such previous efforts certain desirable characteristics have been sacrificed in favor of others. For example, in an effort to obtain radial compactness previous efforts have provided for at least one end of the flywheel to be supported for rotation by a bearing assembly interposed between the flywheel and output shaft. Such an arrangement requires extension of the output shaft beyond the flywheel for rotational support, whereby axial compactness is sacrificed and, more importantly, the imposition of a bearing between the flywheel and output shaft is a potential danger in that freezing of the bearing can cause undesired rotation of the output shaft through the flywheel. Efforts to avoid the latter situation have resulted in arrangements in which the flywheel is disposed at one end of the housing and has a portion extending axially inwardly of the housing such that the flywheel is supported for rotation relative to the housing by a bearing assembly therebetween. This lends to axial compactness and eliminates the potential rotation of the output shaft by the flywheel. At the same time, however, radial compactness is sacrificed by the necessary expansion of the housing to accommodate the flywheel. Additionally, the end of the output shaft at the one end of the housing has no bearing support with respect to the housing, whereby unbalanced loading and undesirable load forces are potential problems in connection with operation and maintenance of the drive mechanism. Moreover, such a drive mechanism can be mounted at one end only, thus reducing versatility with regard to use thereof and requiring larger and stronger mounting supports and housing components to assure adequate support for the drive mechanism when mounted.

The brake-clutch-flywheel drive mechanism according to the present invention advantageously provides both axial and radial compactness, balanced rotational support for the output shaft and flywheel, and rotational support for the flywheel independent of the rotational support for the output shaft. Additionally, the drive mechanism is adapted to be supported at its opposite ends to facilitate installation thereof and to provide balanced loading with respect to the support components and the components of the drive mechanism.

More particularly in accordance with the present invention, these advantages are achieved by supporting the opposite ends of both the flywheel and output shaft for independent rotation relative to fixed support members. The flywheel surrounds the shaft in concentric relationship therewith and is positioned between the opposite ends of the shaft. The brake and clutch units and the actuating mechanism therefor are located radially between the flywheel and shaft and axially between the support members. This arrangement optimizes both radial and axial compactness of the drive mechanism while affording balanced rotational support for both the output shaft and the flywheel and independent rotational support for the shaft and flywheel, thus to eliminate the possibility of the shaft being driven by the flywheel due to freezing of the flywheel bearings. Each of the fixed support members is suitably attached to components of the press frame, whereby the forces resulting from the load of the drive mechanism are equally distributed to the press frame and are not imposed on components of the drive mechanism.

Accordingly, it is an outstanding object of the present invention to provide a brake-clutch-flywheel press drive mechanism having an improved flywheel and output shaft rotational support arrangement.

Another object is the provision of a drive mechanism of the foregoing character by which balanced rotational support for the output shaft and flywheel is achieved.

Yet another object is the provision of a drive mechanism of the foregoing character in which the flywheel and output shaft are independently supported for rotation relative to one another.

A further object is the provision of a drive mechanism of the foregoing character which enables optimizing radial and axial compactness of the mechanism and obtaining balanced load and force distribution with respect to the component parts of the drive mechanism.

Still a further object is the provision of a drive mechanism of the foregoing character readily adapted to be used as an original or replacement unit with a variety of press designs and having a support structure which facilitates versatility in mounting the mechanism on a given press.

Yet a further object is the provision of a drive mechanism of the foregoing character which is structurally simple, economical to produce and operate, highly efficient in operation, and minimizes wear of component parts and maintenance requirements and costs.

The foregoing objects, and others, will in part be obvious and in part pointed out more fully hereinafter in conjunction with the written description of a preferred embodiment of the invention illustrated in the accompanying drawings in which.

Figure 1:
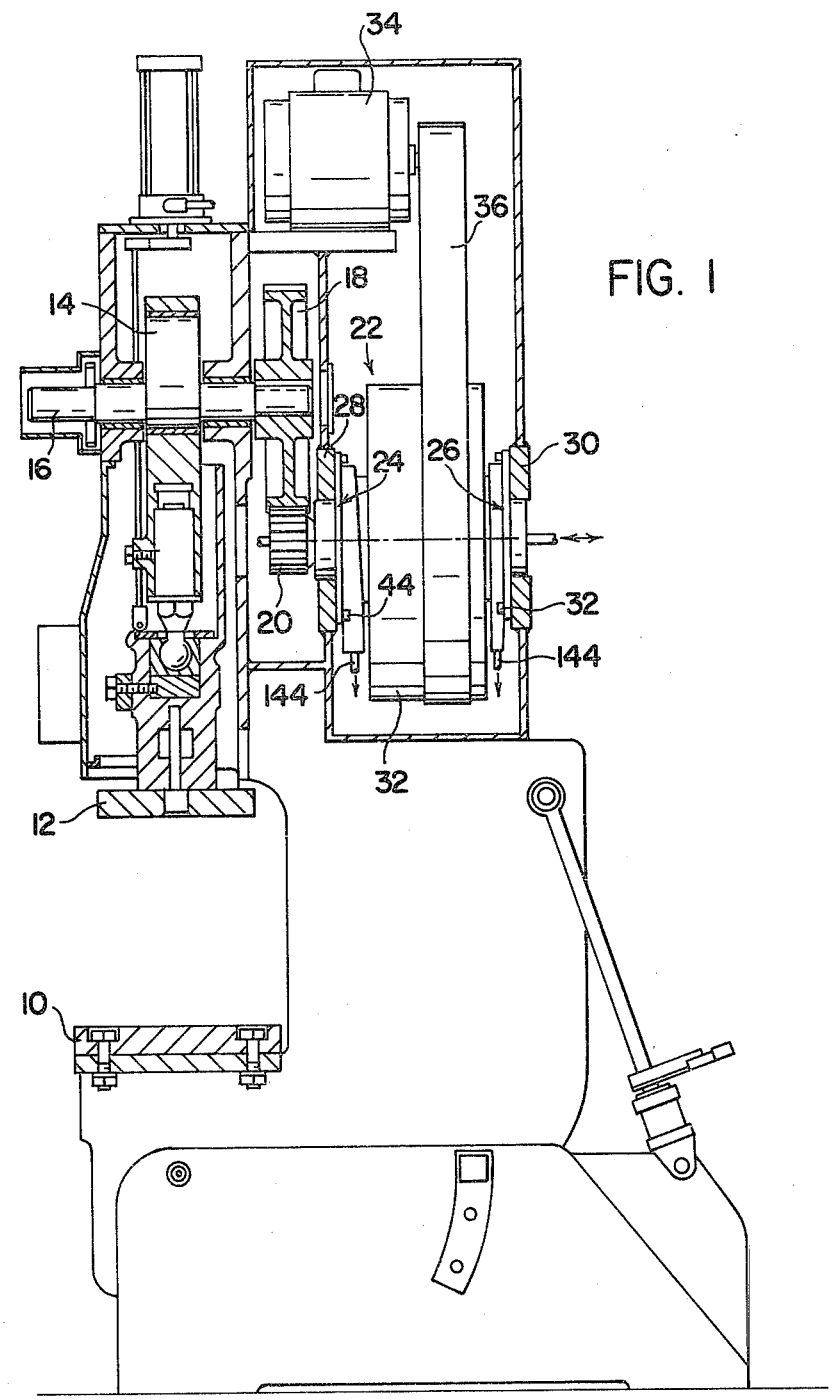
FIG. 1 is a side elevational view, partially in section, of a press and illustrating a drive mechanism of the present invention mounted thereon.

Referring now in greater detail to the drawings wherein the showings are for the purpose of illustrating a preferred embodiment of the present invention only and not for the purpose of limiting the invention, a metalworking press is illustrated in FIG. 1 of the drawing which includes a frame supporting a fixed work supporting platen 10 and a reciprocable tool supporting platen 12. The tool supporting platen is adapted to be reciprocated in a well known manner by means of a rotatable crank 14 having a shaft 16 which is supported for rotation by the press frame and is provided on one of its opposite ends with a drive gear 18. Accordingly, rotation of gear 18 rotates crank 14 to impart reciprcoating motion to tool support platen 12.

Gear 18 is adapted to be rotated by a pinion gear 20 which is coupled to the output shaft of a brake-clutch-flywheel drive mechanism 22 of the present invention. As described more fully hereinafter, drive mechanism 22 includes a pair of fixed support members 24 and 26 by which the drive mechanism is mounted on the press such as by bolting members 24 and 26 to mounting supports 28 and 30, respectively, which may be part of or attached to the press frame. Further, drive mechanism 22 includes a flywheel 32 rotatably mounted on support plates 24 and 26, and flywheel 32 is adapted to be driven by a suitable motor such as electric motor 34 through a drive belt 36.

Figure 2:
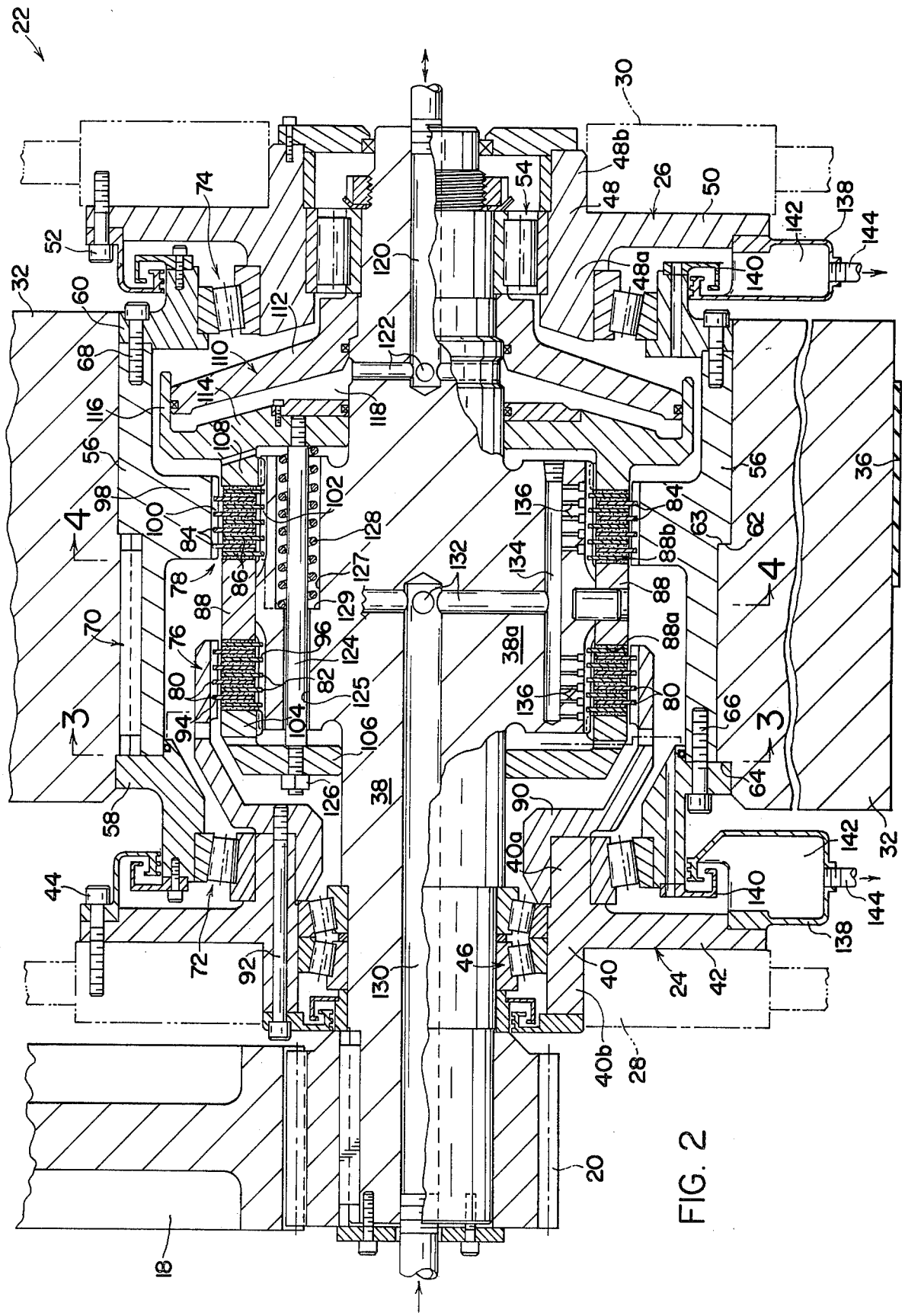
FIG. 2 is an elevation view, in section, of the drive mechanism illustrated in FIG. 1.
Figure 3:
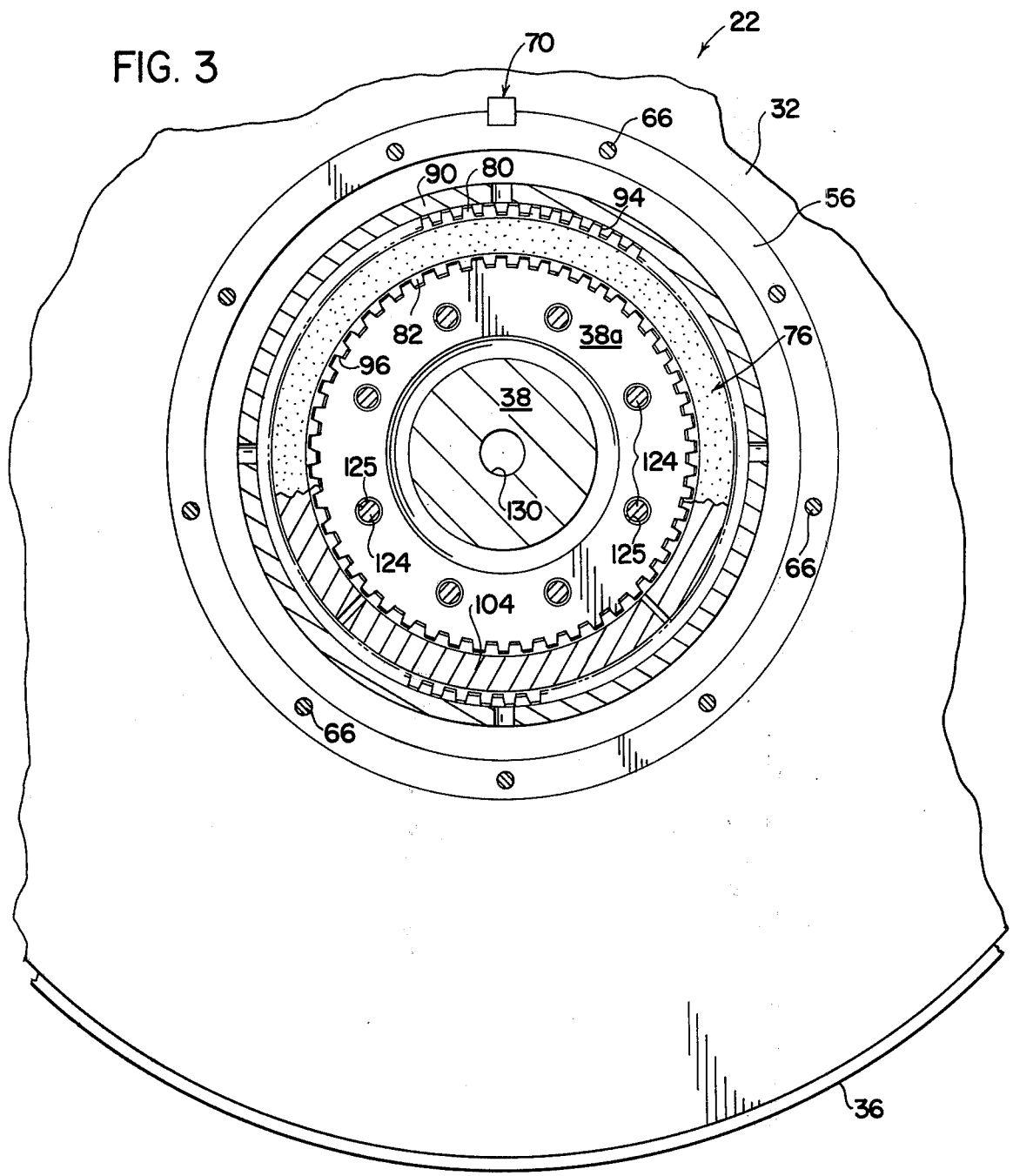
FIG. 3 is a cross-sectional view of the drive mechanism taken along line 3—3 in FIG. 2; and, FIG. 4 is a cross-sectional view of the drive mechanism taken along line 4—4 in FIG. 2.
Figure 4:
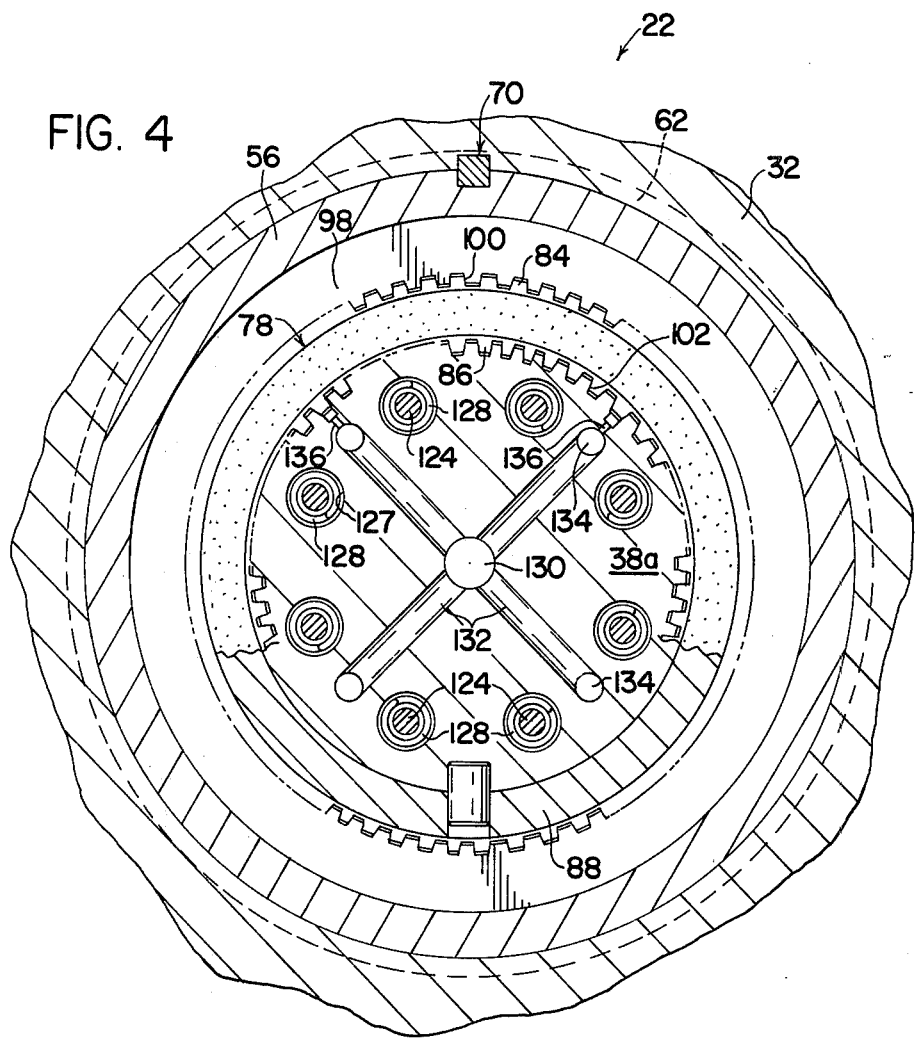

The general arrangement of the components of drive mechanism 22 is illustrated in FIGS. 2-4 of the drawing. As will be seen from these Figures, fixed support members 24 and 26 are parallel and spaced apart to define opposite ends of the drive mechanism and have apertures therethrough to receive and rotatably support an output shaft 38 which carries gear 20 on one end thereof. More particularly, support member 24 includes a hub 40 and a radially outwardly extending plate portion 42 by which the support member is attached to mounting members 28 such as by means of a plurality of studs 44. Hub 40 includes a portion 40a extending axially inwardly of plate portion 42 and a portion 40b extending axially outwardly of the plate portion. A bearing assembly 46 is interposed between hub 40 and output shaft 38 to support the corresponding end of the output shaft for rotation. Similarly, support member 26 at the opposite end of the drive mechanism includes a hub 48 and a radially outwardly extending plate portion 50 by which the support member is attached to mounting members 30 such as by means of a plurality of studs 52. Hub 48 includes an axially inwardly extending portion 48a and an axially outwardly extending portion 48b, and a bearing assembly 54 is interposed between hub 48 and output shaft 38 to rotatably support the corresponding end of the shaft.

Flywheel 32 is disposed between end support members 24 and 26 and is supported thereby for rotation relative thereto and independent of the rotational support of output shaft 38. More particularly, flywheel 32 is mounted on a sleeve assembly extending between support members 24 and 26 and including a sleeve member 56 coaxial with output shaft 38 and collars 58 and 60 attached to the axially opposite ends of sleeve 56. The outer surface of sleeve 56 is stepped to provide a shoulder 62 and the inner surface of flywheel 32 is stepped to provide a shoulder 63 which engages shoulder 62 to axially position flywheel 32 on sleeve 56. The end of flywheel 32 adjacent collar 58 is provided with a peripheral shoulder 64 engaged by collar 58, and a plurality of studs 66 extend through collar 58 and into sleeve 56 to interconnect the collar and sleeve and to maintain flywheel 32 against sleeve shoulder 62. A plurality of studs 68 extend through collar 60 and into sleeve 56 to interconnect the latter collar and sleeve, and relative rotation between flywheel 32 and the sleeve assembly is prevented by means of a key and keyway arrangement 70 between the flywheel and sleeve 56.

Collar 58 axially overlaps and surrounds hub portion 40a of end support member 24, and collar 60 axially overlaps and surrounds hub portion 48a of support member 26. The sleeve assembly and flywheel are supported for rotation relative to support members 24 and 26 by means of bearing assemblies 72 and 74 between the collars and corresponding hub portion. Thus, it will be appreciated that flywheel 32 and output shaft 38 are each supported adjacent their opposite ends for rotation relative to support members 24 and 26 and for rotation relative to and independent of one another.

Drive mechanism 22 further includes a brake assembly 76 and a clutch assembly 78 in the radial space between sleeve member 56 and output shaft 38. Brake assembly 76 includes a plurality of interposed brake discs 80 and 82, and clutch assembly 78 includes a plurality of interposed clutch discs 84 and 86. The brake and clutch discs are positioned on axially opposite sides of an abutment ring 88 which is axially and circumferentially fixed on a radially enlarged portion 38a of output shaft 38. Abutment ring 88 has axially opposite ends 88a and 88b respectively defining brake and clutch disc abutment surfaces.

Brake discs 80 are supported against rotation relative to end support member 24 and for axial displacement relative thereto by means of a brake disc supporting sleeve 90 which is attached to end support member 24 by means of a plurality of studs 92 extending through hub 40. The outer peripheries of brake discs 80 and the inner periphery of the axially inner end of sleeve 90 are cooperatively interengaged such as by a splined interconnection 94. In a well known manner, splined interconnection 94 provides for discs 80 to be fixed against rotation and to be axially slidable relative to sleeve 90. The inner peripheries of brake discs 82 and the outer periphery of the underlying shaft portion 38a are cooperatively interengaged such as by a splined interconnection 96 which provides for brake discs 82 to rotate with output shaft 38 and to be axially slidable relative thereto.

The inner surface of sleeve 56 is provided with a circumferentially extending radially inwardly projecting flange 98, and the outer peripheries of clutch discs 84 and the inner periphery of flange 98 are cooperatively interengaged through a splined interconnection 100. It will be appreciated that this splined interconnection provides for clutch discs 84 to rotate with sleeve 56 and to be axially slidable relative thereto. The inner peripheries of clutch discs 86 and the outer periphery of the underlying shaft portion 38a are cooperatively interengaged by a splined interconnection 102 which provides for clutch discs 86 to rotate with output shafts 38 and to be axially slidable relative thereto.

Brake assembly 76 further includes an annular brake pressure member 104 which is rotatable with output shaft 38 and axially reciprocable relative thereto in the direction toward and away from end 88a of abutment ring 88. In the embodiment shown, the inner periphery of presser member 104 has a splined interconnection with the underlying shaft portion 38a and is supported for axial reciprocation relative to the output shaft by a radially inwardly extending ring portion 106 which is integral with presser member 104 and slidably surrounds the output shaft. Clutch assembly 78 further includes an annular clutch presser member 108 which is rotatable with the output shaft and axially slidable relative thereto in a direction toward and away from end 88b of abutment ring 88. In the embodiment shown, the inner periphery of presser member 108 has a splined interconnection with the underlying shaft portion 38a and is integrally connected with a component of the actuating assembly, to be described hereinafter, so as to be axially reciprocable relative to the output shaft.

The brake and clutch assemblies are adapted to be alternately actuated by displacing the brake and clutch discs toward the corresponding end of abutment ring 88. In the embodiment shown, such alternate displacement is achieved by an actuating mechanism which provides for presser members 104 and 108 to be reciprocated together in axially opposite directions. The actuating mechanism includes a pneumatic piston and cylinder unit 110 including a radially extending annular piston member 112 attached to output shaft 38 adjacent end support member 26 for rotation with the output shaft and against axial displacement relative thereto. Piston and cylinder unit 110 further includes a cylinder member having a radially outwardly extending wall 114 surrounding and slidably engaging output shaft 38 and an axially outwardly extending peripheral wall 116 slidably receiving the outer periphery of piston member 12. The space between the piston and cylinder members defines a chamber 118, and the corresponding end of output shaft 38 is provided with an axial passageway 120 and radial passageways 122 for directing air under pressure from a suitable source, not shown, into chamber 118.

The brake and clutch actuating mechanism further includes a plurality of rigid actuator rods 124 extending through corresponding openings 125 in portion 38a of the output shaft and interconnecting presser members 104 and 108 for reciprocation together in axially opposite directions relative to the output shaft. For this purpose, one end of each rod 124 is threadedly engaged with wall 114 of the cylinder member of piston and cylinder unit 110, and the other end of each rod is threaded to receive a nut 126 by which ring 106 is axially clamped against a shoulder on the corresponding end of the rod. An axial portion 127 of each of the rod openings 125 extending through shaft portion 38a is radially enlarged to receive a corresponding compression spring 128. The axially inner end of spring 128 abuts against a shoulder 129 at the inner end of enlarged portion 127, and the outer end of the spring abuts against cylinder wall 114. Springs 128 bias the cylinder member toward piston 112 and thus bias presser member 104 toward end 88a of abutment ring 88 to engage the brake. At the same time, springs 128 bias presser member 108 in the direction away from end 88b of the abutment ring to release the clutch. By introducing air under pressure into chamber 118, the cylinder member of piston and cylinder unit 110 is displaced away from piston 112 and against the bias of springs 128. This movement of the cylinder displaces presser member 108 toward end 88b of abutment ring 88 to engage the clutch and displaces presser member 104 in the direction away from end 88a of the abutment ring to release the brake. The rigid interconnection of the presser members for movement together advantageously prevents an overlap in the braking and clutching functions.

It is to be noted that radially inwardly extending flange 98 of sleeve 56 and radially inwardly extending collar 60 on the end of the sleeve provide a radial recess with the inner surface of the sleeve which accommodates the outer periphery of piston and cylinder unit 110. This advantageously promotes radial and axial compactness of the drive mechanism without sacrificing a desirable effective surface area for air pressure actuation of the piston and cylinder unit.

Preferably, the component parts of the drive mechanism are lubricated and cooled by continuous circulation of a liquid such as oil therethrough. For this purpose, the end of output shaft 38 adjacent end support member 24 is provided with an axial passageway 130 adapted to be connected to a suitable source of oil, not illustrated, and the shaft is provided with branch passageways 132, 134 and 136 by which oil is distributed to the interior of the drive mechanism through the brake and clutch disc components. End support members 24 and 26 are provided with corresponding oil accumulators 138 surrounding the corresponding one of the sleeves 58 and 60 and having radially inner peripheries slidably and sealingly engaging the collar. Further, each collar is provided with an oiled diverter ring 140 to channel accumulated oil into sump areas 142 of the accumulators. Oil received in accumulators 138 is discharged therefrom through outlet passages 144 and, preferably, to an external heat transfer unit for cooling before returning to inlet passage 130.

From the foregoing description of the embodiment illustrated in the drawings, it will be appreciated that operation of the drive mechanism is as follows. When the component parts are in the position illustrated in FIG. 2, springs 128 bias presser members 104 and 108 to the right, whereby brake discs 80 and 82 are pressed into engagement with end 88a of abutment ring 88. This engages the brake to prevent rotation of output shaft 38, and the position of presser member 108 releases the clutch discs so that flywheel 32 can rotate relative to the output shaft. By introducing air under pressure into chamber 118 of piston and cylinder unit 110, the cylinder member is displaced to the left in FIG. 2 against the bias of springs 128 to displace presser member 108 toward end 88b of abutment ring 88 and to displace presser member 104 in the direction away from the abutment ring. This engages the clutch and disengages the brake, whereby rotation of flywheel 32 rotates output shaft 38. Upon release of air under pressure from chamber 118, springs 128 bias the cylinder and thus the presser members to the positions illustrated in FIG. 2 to reengage the brake and release the clutch.

While considerable emphasis has been placed herein on the specific structure of and the specific structural interrelationship between component parts of the drive mechanism, it will be readily appreciated that many changes can be made in the structures and relationships shown without departing from the principles of the present invention. For example, brake and clutch actuating arrangements other than the piston and cylinder arrangement shown can be employed and, in connection with a piston and cylinder actuating arrangement, the cylinder component can be fixed with respect to the output shaft and the piston component axially displaceable relative thereto. Further, while the clutch presser member is disclosed as being integral with the cylinder member of the piston and cylinder unit it will be appreciated that these components can be structurally separate and suitably interconnected for displacement of the cylinder to impart like displacement to the clutch presser member. Still further, other sleeve and end support structures can be devised for supporting the flywheel and output for rotation. It is only important in accordance with the present invention that opposite ends of the flywheel be supported for rotation relative to fixed support members so that the rotational support of the flywheel is balanced and that the flywheel be supported for rotation independent of the rotational support for the output shaft.

Since many embodiments of the present invention can be made and since many changes can be made in the embodiment herein illustrated and described, it is to be distinctly understood that the foregoing descriptive matter is to be interpreted merely as illustrative of the present invention and not as a limitation.

What is claimed is:

1. A press drive mechanism comprising spaced apart first and second fixed support means having axially aligned openings therethrough, an output shaft having axially opposite ends each rotatably supported in a corresponding one of said openings, flywheel means surrounding said output shaft and having axially opposite ends each rotatably supported by a corresponding one of said support means independent of said output shaft, clutch means radially between said output shaft and flywheel means and including clutch disc means cooperatively supported relative to said flywheel means and output shaft, brake means radially between said output shaft and flywheel means and including brake disc means cooperatively supported relative to said output shaft and said fixed support means, and clutch and brake actuating means for alternately engaging and disengaging said clutch means and brake means.

2. The press drive mechanism according to claim 1, wherein said flywheel means includes rotatable sleeve means surrounding said output shaft and a flywheel mounted on said sleeve means for rotation therewith.

3. The press drive mechanism according to claim 1, wherein said actuating means is axially between said fixed support means and radially inwardly of said flywheel means.

4. The drive mechanism according to claim 1, wherein said clutch and brake means includes abutment means fixed on said output shaft and said actuating means includes clutch and brake presser means reciprocable axially of said output shaft to alternately displace said clutch disc means and brake disc means toward said abutment means.

5. The drive mechanism according to claim 1, wherein said actuating means is piston and cylinder means coaxial with said output shaft and including relatively reciprocable piston and cylinder members, one of said piston and cylinder members being axially fixed on said output shaft and the other being axially slidable relative to said shaft.

6. The drive mechanism according to claim 5, wherein said clutch and brake means includes abutment means fixed on said output shaft and axially between said clutch disc means and brake disc means, said actuator means further including axially opposed clutch and brake presser members movable in axially opposite directions to alternately displace said clutch disc means and brake disc means in the corresponding direction toward said fixed abutment means, and means including said other of said piston and cylinder members interconnecting said presser members for axial movement together in said opposite directions.

7. The drive mechanism according to claim 6, wherein said piston member is fixed on said shaft at one end thereof and axially inwardly adjacent the corresponding support means, and said cylinder member is axially slidable relative to said shaft.

8. A press drive mechanism comprising spaced apart first and second support means having axially aligned openings therethrough, an output shaft between said support means and having axially spaced portions received in said openings, first bearing means between each said shaft portions and the corresponding one of said openings supporting said shaft for rotation relative to said support means, sleeve means surrounding said output shaft and having axially spaced portions adjacent said support means, second bearing means between each said sleeve portions and the corresponding one of said support means supporting said sleeve means for rotation relative to said support means and said output shaft, a flywheel mounted on said sleeve means for rotation therewith, clutch means including clutch disc means cooperatively supported relative to said output shaft and said sleeve means, brake means including brake disc means cooperatively supported relative to said output shaft and said fixed support means, and clutch and brake actuating means radially within said sleeve means and axially between said support members.

9. The drive mechanism according to claim 8, wherein said first and second support means are end plate members, said openings being defined in part by hub means extending axially inwardly of said end plate members, said axially spaced portions of said sleeve means surrounding the corresponding one of said hub means, and said second bearing means being radially between said hub means and sleeve portions.

10. The drive mechanism according to claim 9, wherein said sleeve means includes an axially extending sleeve member having opposite ends and radially inwardly extending collars attached at each of said ends of said sleeve member and defining said axially spaced sleeve portions.

11. The drive mechanism according to claim 10, wherein said clutch and brake means includes abutment means fixed on said output shaft and axially between said clutch disc means and brake disc means, said actuator means including clutch and brake presser members movable in opposite directions to alternately displace said clutch disc means and brake disc means in the corresponding direction toward said abutment means, and means including piston and cylinder means coaxial with said output shaft and interconnected with said presser members to displace said presser members in said opposite directions.

12. The drive mechanism according to claim 11, wherein said sleeve member includes a radially inwardly projecting disc supporting flange extending about the inner periphery of the sleeve member, said flange being spaced axially inwardly from one of said radially inwardly extending collars, said flange and said one collar defining a circumferentially extending radial cavity with the inner surface of said sleeve member adjacent one of said end plate members, said piston and cylinder means being adjacent said one end plate member and extending radially into said cavity.

13. The drive mechanism according to claim 12, wherein said piston and cylinder means includes a piston member axially fixed on said output shaft and a cylinder member axially slidable relative to said piston member and output shaft.

14. The drive mechanism according to claim 13, wherein said actuator means further includes means interconnecting said clutch and brake presser members for movement together, said cylinder member being connected to one of said presser members for displacing said presser member in one of said opposite directions, and spring means biasing said presser members in the other direction.

* * * * *